United States Patent [19]

Voorhees et al.

[11] 4,327,621
[45] May 4, 1982

[54] SELF STEERING BLADE GUIDE FOR A BAND SAW

[75] Inventors: John E. Voorhees, Sidney; Thomas M. Johnson, Troy, both of Ohio

[73] Assignee: Hobart Corporation, Troy, Ohio

[21] Appl. No.: 88,490

[22] Filed: Oct. 26, 1979

[51] Int. Cl.³ .......................... B27B 13/10; B26D 1/54
[52] U.S. Cl. ....................................... 83/820; 83/821
[58] Field of Search ......................... 83/820, 821, 788

[56] References Cited

U.S. PATENT DOCUMENTS

| | | | |
|---|---|---|---|
| 1,783,330 | 12/1930 | Edwards | 83/820 X |
| 2,695,637 | 11/1954 | Ocenasek | 83/820 X |
| 2,705,510 | 4/1955 | Stocke | 83/820 X |
| 2,914,100 | 11/1959 | Lindholm | 83/820 X |

Primary Examiner—Donald R. Schran

Attorney, Agent, or Firm—Biebel, French & Nauman

[57] ABSTRACT

A self steering blade guide for a band saw, including a support block which can be rigidly fixed to the frame structure adjacent the blade and which supports a steering block having a blade receiving slot with side surfaces adjacent the flat sides of the blade and engagable therewith upon the sideways deflection of the blade, and a mounting connection between the steering block and the support block for permitting pivotal movement of the steering block about an axis parallel to the direction of travel of the blade, the axis being adjacent to or forward of the cutting edge so that the blade will pivot about the axis with the steering block when deflected, and through action on the blade by the material being cut the blade will automatically be returned to its normal position parallel to the direction of feed of the material through the blade.

8 Claims, 7 Drawing Figures

U.S. Patent
May 4, 1982     Sheet 1 of 3     4,327,621
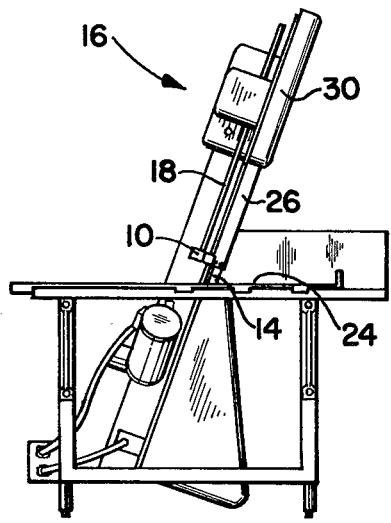
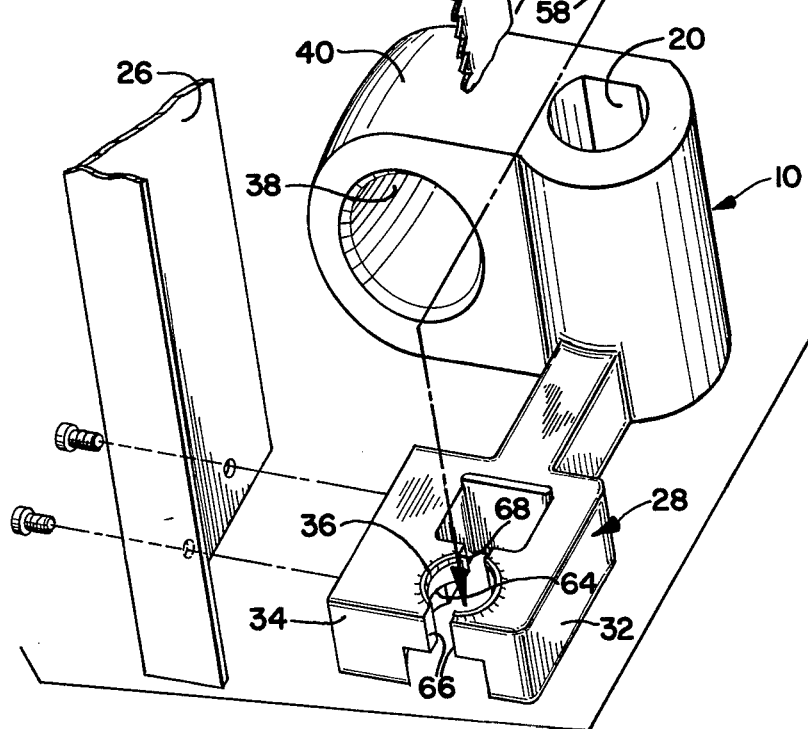

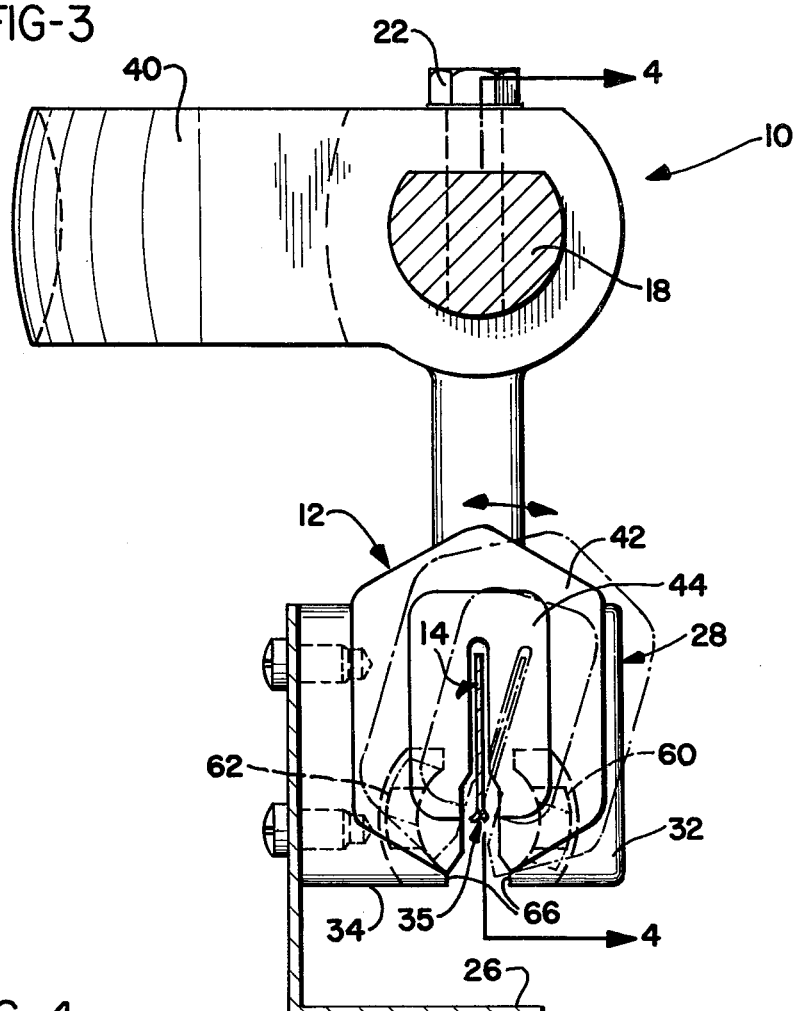
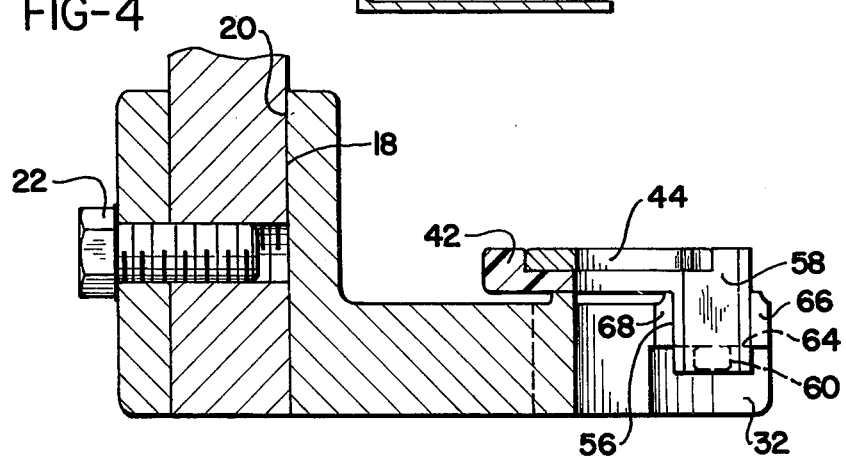

SELF STEERING BLADE GUIDE FOR A BAND SAW

BACKGROUND OF THE INVENTION

1. Field of the Invention

The present invention relates to a guide for a saw blade, and more particularly, to a self steering guide for a band saw blade, or the like.

2. Prior Art

Band saws are used in many and diverse applications, such as for cutting meat, metal plates and lumber, and in many of these applications the band saw has shown a common undesirable feature in that it has a tendency to deviate from the desired cutting path with the deviation increasing as the blade continues to depart from its intended path through the material being cut, which is normally fed through the blade in a direction parallel to the plane of the blade. One reason for this phenomenon appears to be that the blades are not produced with sufficient accuracy to result in equal cutting forces being produced by the teeth on both sides of the blades and thus the cutting edge tends to track to one side or the other of the desired cutting path. As the blade progresses through the material in this abnormal posture the material applies a force to the flat side of the blade which is presenting itself to the oncoming material which tends to increase the sideways deflection of the blade so that the blade deviation from its intended track is continuously increased. Furthermore, experience has shown that blade deviation is more pronounced at higher rates of feeding of the material past the blade.

This phenomenon results in inaccurate cuts and a reduction in useable feeding rates, as well as blade guide wear, due to the frictional forces between the blade and the blade guide. In their simplest form, blade guides take the form of a slot formed in the table upon which the material rests when it is being fed through the blade, with the sides of the slot being closely adjacent the sides of the blade so that as the blade deflects it will be biased against the blade guide and rests against the guide on one side or the other during cutting of the material. It can readily be seen that this simple blade guide configuration merely attempts to restrain blade deviation and lacks any means to impart positive corrective force thereto.

In order to overcome the shortcomings of such simple blade guides as described above, many blade guides and blade controlling mechanisms have been devised for detecting and correcting deviation of the blade off its intended course. Some of these devices utilize the physical deflection of the blade itself to apply force through a series of lever arm mechanisms to the back edge of the blade to redirect the blade back to its intended path through the material. One such device is disclosed, for example, in U.S. Pat. No. 3,116,768.

Other types of blade guide devices utilize a separate force-applying mechanism in conjunction with a blade deflection sensing system so that when deflection of the blade from its normal intended path occurs the blade guide will apply a counteracting force from an external source to again correct the position of the blade back to the intended path. This type of device is disclosed, for example, in U.S. Pat. Nos. 2,914,100 and 2,914,102.

Both of these latter types of mechanisms are fairly complicated and expensive which makes their employment in many industries unacceptable. In addition, some industries do not require the degree of control that some of these mechanisms are designed to provide and by reason of which they have become relatively complicated. There is therefore a need in such industries for a blade guide which is less complicated and thus less expensive, but which provides the degree of control necessary to maintain a reasonable alignment of the blade with the intended course of the blade through the material being cut.

SUMMARY OF THE INVENTION

The present invention overcomes the above described difficulties and disadvantages associated with the prior art blade guide mechanisms by providing a self-steering blade guide which is both economical and uncomplicated to produce and which is particularly suitable for such industries as the meat cutting industry, although it is clearly capable of being used in other industries where band saws of a similar nature are utilized. However, since the self-steering blade guide of the present invention was designed particularly for use in the meat cutting industry, it will be discussed below in conjunction with use on such saws as are disclosed, for example, in U.S. Pat. No. 2,585,957.

While the prior art teaches the use of mechanical or hydraulic mechanisms for resisting deflection of the blade and producing a counteracting force against the blade to return it to its normal position, the self-steering blade guide of the present invention controls blade deflection so as to confine it or limit it to a twisting motion about a pivotal axis located adjacent to the blade cutting edge as a result of the force of the material being cut acting against the twisted blade to direct it back to its normal position.

The self steering blade guide of the present invention is intended to be utilized with a band saw blade having a forward cutting edge, a back edge and flat sides. The guide includes a support block disposable in fixed position adjacent the saw blade, a steering block with a blade receiving slot defined therein with side surfaces adjacent the flat sides of the blade and engagable therewith upon sideways deflection of the blade, and means for mounting the steering block on the support block for pivotal movement about an axis parallel to the direction of blade travel and adjacent to or forward of the cutting edge of the blade, so that the blade will pivot about this axis with the steering block when it is deflected.

The guide of the present invention assists the blade in acting much in the same manner as a wind vane, as it passes through the material being cut. The material being cut, such as meat, acts upon the blade much the same way that wind acts upon a wind vane in that it applies a force to the side of the deflected blade which causes it to track behind the pivotal point of the blade which is preferably at approximately the center of the cutting teeth, although it can be forward thereof.

A guide in accordance with the present invention is preferably secured to the frame structure immediately adjacent the blade both above and below the table which supports the material to be cut. Sufficient space is provided between the upper guide and the table to permit the thickness of the material being cut to pass under the upper guide without touching it. The support block for each guide preferably includes an extension member which provides opposed arcuate surfaces on opposite sides of the blade that define bearing surfaces for pivotally mounting the steering block. The steering block has corresponding arcuate surfaces which mate with the bearing surfaces, for effecting pivotal movement of the steering block about a central pivotal axis defined by the arcuate bearing surfaces of the support block upon deflection of the blade.

The width of the slot in the steering block is preferably only slightly larger than the width of the blade. Therefore, only a small amount of deflection of the blade is necessary before it contacts one of these side surfaces defining the slot in the steering block. As a result, the steering block can very quickly begin to cause the blade to rotate only about the pivotal axis rather than permitting sideways deflection of the blade.

It is also preferably to provide a hardened insert in the steering block so that the main body of the steering block can be made of a much softer or lighter metal. The hardened insert prevents the blade from wearing into the surfaces forming the slot.

BRIEF DESCRIPTION OF THE DRAWINGS

FIG. 1 is a pictorial view of a meat cutting saw illustrating an example of the type of band saw, on which the present invention can be utilized;

FIG. 2 is an exploded pictorial view of the preferred embodiment of the present invention;

FIG. 3 is a top plan view of the preferred embodiment;

FIG. 4 is a cross sectional view along line 4—4 of FIG. 3;

DETAILED DESCRIPTION OF THE PREFERRED EMBODIMENTS

Figure 5:
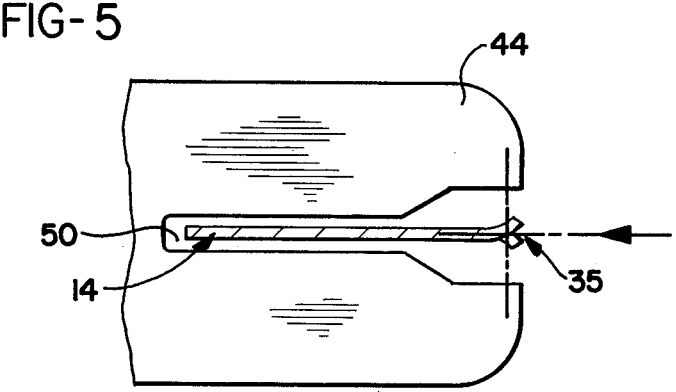
FIG. 5 is a schematic illustration of the position of the saw blade and guide of the present invention disposed relative to the direction of feed of material through the saw blade and illustrating the preferred pivotal axis position.

Preferably, a pair of self-steering blade guides is incorporated by the band saw, one being positioned at a location spaced above the upper surface of the band saw table and the other below the table upper surface whereby guidance of the band saw blade is provided both above and below the material being cut. Since both of the blade guides are identical in construction except for the configuration of the portion of the main support block for attaching the same to the band saw frame, only one of the guides needs to be described in detail. As readily apparent, the guide positioned above the table surface is the one described herein.

As best seen in FIG. 2, the self steering blade guide of the present invention is basically comprised of a main support block 10 and a steering block assembly 12, which can be positioned around the run of the band saw blade 14 which will do the cutting. The guide is mounted on a band saw 16 by attaching it to a movable rod 18 which fits into a corresponding bore 20 formed in support block 10. Bore 20 is cylindrical except for a flat side which is used to properly align the support block 10 on the rod 18 which has a corresponding flat side, the support block 10 being secured to the lower end of the rod 18 such as by a screw 22, as shown in FIG. 4.

The opposite end of the rod 18 is secured to the upper portion of the band saw in such a way that it can be movable parallel to the blade 14 and secured in a desired position in order to permit the lower edge of the support block 10 to be positioned at a height above the surface of the table 24, depending upon the thickness of the material to be passed through the blade. This adjustment permits the guide to be positioned as closely as possible to the table 24 in order to obtain maximum effect of the guide. A blade guard 26 in the form of a thin metal sheet is bolted to an extension 28 of support block 10 and extends up into the upper band saw cover 30 so that as the guide is raised or lowered the guard 26 will cover that portion of the blade 14, above the guide.

The extension 28 of the support block 10 provides a pair of arms 32 and 34 which extend on opposite sides of the blade 14 and are so positioned that a forward cutting edge or the teeth 35 of the blade passes through the cylindrical opening 36 defined by the two arms 32 and 34. The arms further define a slot along the center line of the opening 36 which permits the guide to be positioned around the blade. The support block 10 is provided with a large hole 38 on the side extension 40, which is sufficiently large to permit an operator to place his finger in the hole 38 and move the support block 10 and rod 18 up or down to position it in a desired location.

Referring to the steering block assembly 12, it is comprised of two pieces, which are the steering block 42 and insert 44. The steering block 42 has a slot 48 defined therein which opens on the forward end of block 42 so that the steering block can be positioned around blade 14. Slot 48 should be sufficiently wide so that only the sides of a slot 50 defined in the insert 44, as described below, will contact the blade.

A recess 52 is provided in the upper portion of steering block 42 to receive the insert 44. The insert 44 is generally U-shaped and defines the blade receiving slot 50. Insert 44 is made of hard tungsten carbide, or the like, which provides a wear resistant surface on the inside of the slot 50 for engagement with the blade. Slot 50 is only slightly wider than the width of blade 14, providing a clearance, for example, of approximately 0.001 inch on each side of the blade so that some limited sideways movement of the blade is permissible before it contacts the insert 44. In addition, the rear surface of the slot 50 is positioned closely adjacent the back edge of blade 14 so that when the blade is pushed rearwardly by the force of the material being fed through it, the thrust will be taken by this rear surface of the insert and transferred to support block 10.

Insert 44 is positioned in the recess opening 52 in the upper portion of steering block 42 and bonded to the block 42. At its forward end, the steering block 42 has a generally cylindrical, downwardly-depending extension 56 which also defines a blade receiving slot 58 in the center thereof which permits the guide to be positioned around the blade. Extension 56 also has a pair of laterally extending lugs 60 and 62 formed on the lowermost end portion thereof and extending perpendicular to the plane of the slot 58.

Extension 56 is received in the opening 36 defined by the arms 32 and 34 of support block 10. The arcuate bearing surfaces defining opening 36 matingly receive corresponding outer arcuate bearing surfaces defined by extension 56 and corresponding recesses are provided in the bottom surfaces of extensions 32 and 34 for receiving lugs 60 and 62 therein. The recesses define upper annular surfaces such as 64, shown in FIG. 4, against which the upper surfaces of the lugs bear.

In order to permit the steering block 42 to be inserted between the arms 32 and 34 of the support block 10, the gap defined by the surfaces 66 and 68 must be sufficiently wide to permit the lugs 60 and 62 to be passed through these gaps and then rotated so that they pass into the corresponding recesses in the lower portions of the arms 32 and 34 and engage the surfaces 64. Thus, the lugs permit rotation of the steering block 42 in the support block 10 and prevent its being lifted from the support block unless it is rotated through 90 degrees.

Figure 6:
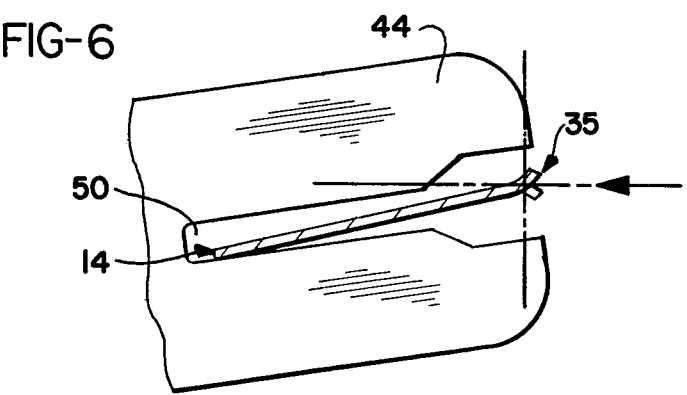
FIG. 6 is a schematic illustration similar to FIG. 5, illustrating, in exaggerated form, the deflection of the saw blade by the material as the blade pivots around the preferred pivotal axis.
Figure 7:
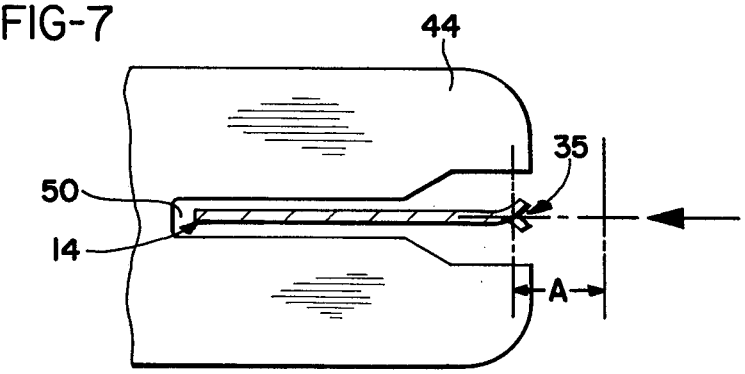
FIG. 7 illustrates an alternative embodiment of the present invention with the pivotal point of the saw blade disposed in advance of the cutting edge.

The axis of rotation of the cylindrical extension 56 within the opening 36 defined by arms 32 and 34 is located at approximately the center of the teeth 35 of the cutting blade, as illustrated in FIGS. 5 and 6. This is believed to be the most favorable location for the axis of rotation of the steering block 42, although it is believed that the device will operate satisfactorily if the axis of rotation is positioned somewhat forward of the cutting edge defined by the teeth of the blade as illustrated for example in FIG. 7.

The distance A is the distance from the pivotal axis of steering block 42 to the center of the teeth 35 of the blade 14, and this distance can vary for different sizes and shapes of saw blades and still permit proper operation of the device in accordance with the present invention. It has been discovered that in the case of a band saw intended for meat cutting purposes the device operates satisfactorily if the distance A is as much as three-sixteenths of an inch in front of the cutting edge 14, although the characteristics of the device are enhanced the closer the pivotal point comes to coinciding with the center line of the teeth of the blade.

Referring particularly to FIGS. 5 and 6, when the pivotal axis of the steering block 42 is positioned at the center of the teeth of the cutting edge, as the blade is twisted it will rotate about this axis due to contact with the insert 44 within the assembly 12. The back edge of the blade 14 will contact the rear surface of the insert 44 defining the slot 50 as the blade is pushed rearward during cutting. Thus, the thrust on the blade is absorbed through the insert and the blade is prevented from moving very far rearward.

As can be seen, if the blade does move rearward slightly, in effect this will place the pivotal axis slightly in front of the cutting teeth of the blade, which is not considered detrimental for operation of the present invention since the rearward deflection of the blade is quite small such as on the order of 0.030 inch. For the purposes of illustration, the gap between the surfaces defining the slots in the steering guide and the blade are substantially exaggerated in FIGS. 5 and 6.

As the blade deviates from the intended path through the material, the side of the saw blade 14 will contact the corresponding surface of the steering block insert 44 which will then cause the blade to pivot about the desired axis. The divergence of the side of the blade from the side of the slot illustrated in FIG. 6 is again exaggerated, and the blade will actually contact along the entire surface of the slot on the side of the blade very quickly so that there is little deviation between the actual pivotal axis of the blade and the intended pivotal axis through the teeth defining the cutting edge.

As the blade pivots about this axis, the material which is being cut will apply corrective forces to the side of the blade which presents itself to the oncoming material and this will cause the blade to be forced back to its intended normal position as illustrated in FIG. 5. If the blade were to deviate in the opposite direction the same would be true in that case. Thus it can be seen, that the self steering blade guide of the present invention uses the force applied by the material to the blade itself to correct for blade deviation from the intended path through the material and no outside corrective forces need be applied.

Although the foregoing illustrates the preferred embodiment of the present invention, variations are possible. As such variations as would be obvious to one skilled in this art are intended to be included within the scope of the invention as defined by the following claims.

What is claimed is:

1. A guide for a band saw blade having a forward cutting edge, a back edge and flat sides, the guide comprising:
   a support block disposable in fixed position adjacent said saw blade;
   a steering block having a blade receiving slot defined therein with side surfaces adjacent said flat sides of said blade and engagable therewith upon sideways deflection of said blade; and
   means mounting said steering block on said support block for free pivotal movement about an axis parallel to said blade and approximately in the center of or forward of said cutting edge, so that said blade is free to pivot about said axis with said steering block when deflected by blade twisting due to resistance of the material being cut.

2. A band saw guide as defined in claim 1, including:
   said support block providing opposed arcuate surfaces on opposite sides of said blade, defining bearing surfaces for said steering block about said pivotal axis;
   said steering block having surfaces mating with said bearing surfaces for effecting pivotal movement of said steering block about said pivotal axis upon deflection of said blade.

3. A band saw guide as defined in claim 1 wherein said steering block includes:
   a wear-resistant insert forming said side surfaces of said blade receiving slot.

4. A band saw guide as defined in claim 1 wherein:
   said steering block slot is further defined by a rear surface disposed parallel to said back edge of said blade and is engagable therewith upon rearward movement of the blade during cutting to transmit thrust forces produced thereby to said support block.

5. A guide as defined in claim 1 wherein said pivotal axis is disposed at a position in the range from said cutting edge to 3/16 inch therebeyond.

6. A guide for a band saw blade having a cutting edge, a back edge, and flat sides, comprising:
   a stationary support block having arms extending in spaced relation on opposite sides of the blade and forward of the cutting edge;
   said arms having opposed arcuate bearing surfaces defining a pivot axis extending parallel to the blade and approximately in the center of or forward of said cutting edge of the blade;
   a steering member including a supporting cylinder contacting said arcuate surfaces and supporting said steering member for free pivotal movement about said axis, and a body portion extending laterally of said cylinder;

said steering member having a slot through said cylinder and body portion of a width slightly greater than the thickness of said blade for receiving said blade therethrough;

whereby deflecting of said blade adjacent the guide is confined to pivoting around the cutting edge and material being cut acts against a side of the blade when pivoted to direct the blade back to its normal path.

7. A guide for a band saw blade as defined in claim 6, including a hard insert mounted in said body portion of said steering member and lining said slot to provide a wear resistant surface where the guide contacts the blade.

8. A guide as defined in claims 6 or 7, including a guard extending from said block along the blade path and in front of said cutting edge.

* * * * *